United States Patent
Tumback et al.

(10) Patent No.: US 6,889,645 B2
(45) Date of Patent: May 10, 2005

(54) METHOD FOR STARTING A HYBRID DRIVE

(75) Inventors: Stefan Tumback, Stuttgart (DE); Dieter Hoetzer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,977

(22) PCT Filed: Jun. 28, 2001

(86) PCT No.: PCT/DE01/02385
§ 371 (c)(1), (2), (4) Date: Aug. 1, 2003

(87) PCT Pub. No.: WO02/18167
PCT Pub. Date: Mar. 7, 2002

(65) Prior Publication Data
US 2004/0011316 A1 Jan. 22, 2004

(30) Foreign Application Priority Data
Aug. 29, 2000 (DE) .......................................... 100 42 370

(51) Int. Cl.⁷ ................................................ F02N 11/04
(52) U.S. Cl. ............................. 123/179.3; 123/179.28; 290/36 R
(58) Field of Search ......................... 123/179.3, 179.28; 290/27, 36 R, 37 R; 180/65.2–65.4

(56) References Cited

U.S. PATENT DOCUMENTS 4,533,011 A 8/1985 Heidemeyer et al.
5,698,905 A * 12/1997 Ruthlein et al. ............... 290/32

FOREIGN PATENT DOCUMENTS

| DE | 197 39 906 | 3/1999 |
|----|-----------|--------|
| DE | 199 03 936 | 5/2000 |
| EP | 0 989 300 | 3/2000 |
| WO | WO 89 04081 | 5/1989 |
| WO | WO 00 26053 | 5/2000 |

OTHER PUBLICATIONS

Derwent abstract published 1992 for SU 1,687,841 A1, Oct. 30, 1991, Chukseev et al.*

* cited by examiner

Primary Examiner—Andrew M. Dolinar
(74) Attorney, Agent, or Firm—Kenyon & Kenyon

(57) ABSTRACT

A method for starting a hybrid drive having a battery, an internal combustion engine, and at least two electric machines, at least one being used to start the internal combustion engine. Reliable starting even at very low temperatures by bringing at least one of the electric machines to a specified or specifiable rotational speed in a state that is uncoupled from the internal combustion engine at the beginning of a starting phase, while electric power is supplied from the battery, and the electric machine is subsequently switched to generator operation; the electric power generated in generator operation is supplied to at least one further one of the electric machines which then starts the internal combustion engine.

7 Claims, 3 Drawing Sheets

METHOD FOR STARTING A HYBRID DRIVE

FIELD OF THE INVENTION

The present invention relates to a method of starting a hybrid drive which has a battery, an internal combustion engine, and at least two electric machines, at least one being used to start the engine.

BACKGROUND INFORMATION

In motor vehicles today, the internal combustion engine is started by a conventional starter. This starter and its connection to the crankshaft are implemented so that the starting torque required for starting the engine is applicable at any time, even at extremely low temperatures (less than −10° C.). The electric current required for this is usually supplied by a 12-volt lead-acid battery.

Motor vehicles having a hybrid drive, as described in PCT International Patent Application No. DE99/03026 and in German Patent Application No. 197 39 906, have one or more electric machines, which may be operated either as motors or as generators, in addition to the internal combustion engine.

A conventional starter is usually omitted in such a hybrid drive. Electric machines in the vehicle assume the function of starter. Since the connection of the electric machines to the internal combustion engine is not optimized for starting the engine, these electric machines require a high electric current from the battery. Although the battery of a hybrid vehicle is designed for a much higher power level than the battery in a conventional vehicle, batteries are frequently unable to meet the electric power demand at cold temperatures in particular.

SUMMARY

The present invention provides a method of starting a hybrid drive, so that reliable starting of the internal combustion engine may occur even at low temperatures.

This may be achieved by, at the beginning of a starting phase, making at least one electric machine rotate at a specified or specifiable rotational speed, while uncoupled from the engine, and then switching to generator operation. The electric power generated in generator operation may be supplied to at least one of the electric machines and used to start the internal combustion engine.

When uncoupled from the internal combustion engine during the starting phase, particular electric machines may be brought to a very high rotational speed using the battery power available even at low temperatures, and this may be accomplished relatively rapidly (e.g., within a few seconds). Then in subsequent generator operation, the electric-power generated by these electric machines may be available for starting the engine in addition to the electric power supplied by the battery.

In the starting phase of the engine, the voltage generated by the at least one electric machine may be regulated at a constant level. A voltage dip at the battery is regulatable through generator operation of the particular electric machines, so that the additional electric machines running in motor operation to drive the internal combustion engine are able to supply their maximum torque.

For starting the engine at the highest possible torque, the at least one additional electric machine may be additionally supplied with electric power from the battery.

The starting operation of the internal combustion engine may also be supported by the fact that a decelerating torque of the at least one electric machine during generator operation is used to start the engine.

If the rotational speed of the at least one electric machine is specified as a function of a battery condition detected, then the starting phase may be shortened as a function of a particular battery condition, e.g., by not accelerating the electric machine(s) provided for generator operation to the highest possible rotational speed.

With the measures indicated here, the energy from the battery is first stored temporarily in the form of kinetic energy in at least one electric machine before the engine is started. The stored kinetic energy is used for power generation in a short period of time in startup in that the at least one particular electric machine switches to generator operation. Due to the conversion of kinetic energy into electricity in at least one electric machine, a sufficiently high on-board power is made available within a short period of time even at very low temperatures in starting the engine. The battery is heated during acceleration of the at least one electric machine to be operated in generator operation, so that more power may be drawn from the battery in starting up the engine using the at least one other electric machine.

DETAILED DESCRIPTION

Figure 1:
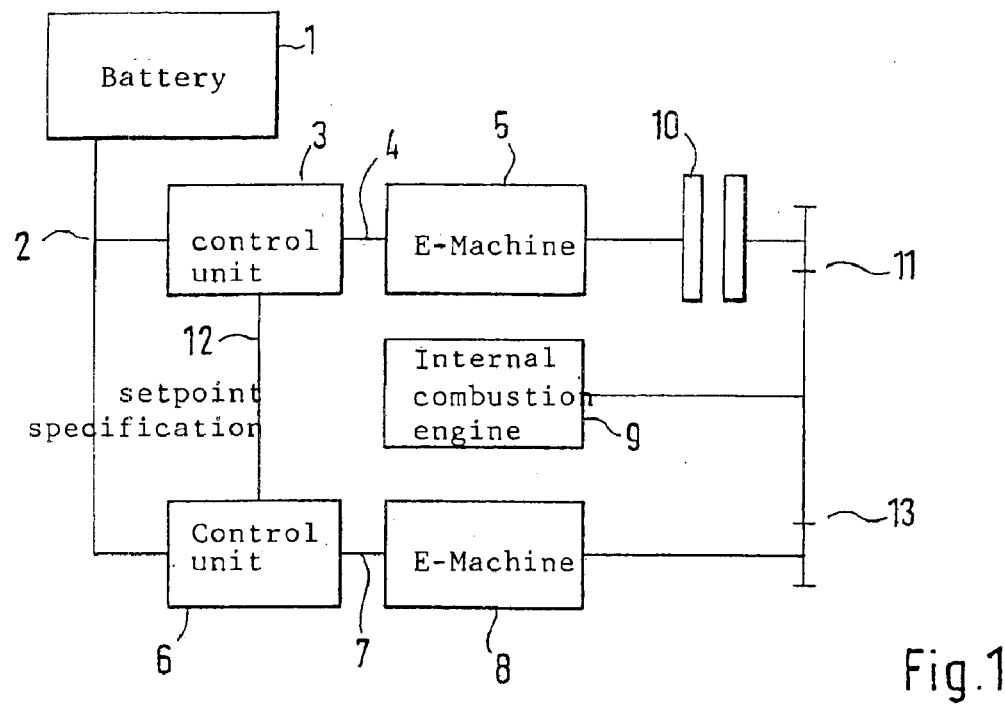
FIG. 1 shows a schematic diagram of the principle of cold start of a hybrid drive on an example embodiment of a hybrid drive having an internal combustion engine and two electric machines.

FIG. 1 illustrates the principle of a cold start on the example of a hybrid drive having an internal combustion engine 9 and two electric machines 5, 8. A battery 1 is connected by a cable 2 to control units 3, 6 of electric machine 5 and to additional electric machine 8. Control units 3, 6, which may be designed as pulse-width-modulation inverters, for example, trigger electric machines 5, 8 via suitable lines 4, 7. Setpoint values, e.g., rotational speeds or torques, may also be preset by an external control unit over appropriate feeder lines 12, also taking into account a monitoring device for the battery power. One electric machine 5 may be kinematically uncoupled from engine 9 with the help of an uncoupling stage 10, e.g., a clutch, to bring it to a specified or specifiable rotational speed first in motor operation and then to operate it in generator operation, and to make available the triggering current for additional electric machine 8, which is connected to engine 9 via transmission 13. In addition to the generator current of electric machine 5, additional electric machine 8 must receive the highest possible electric power from the battery to achieve the highest possible torque of additional electric machine 8 for starting engine 9.

Figure 2:
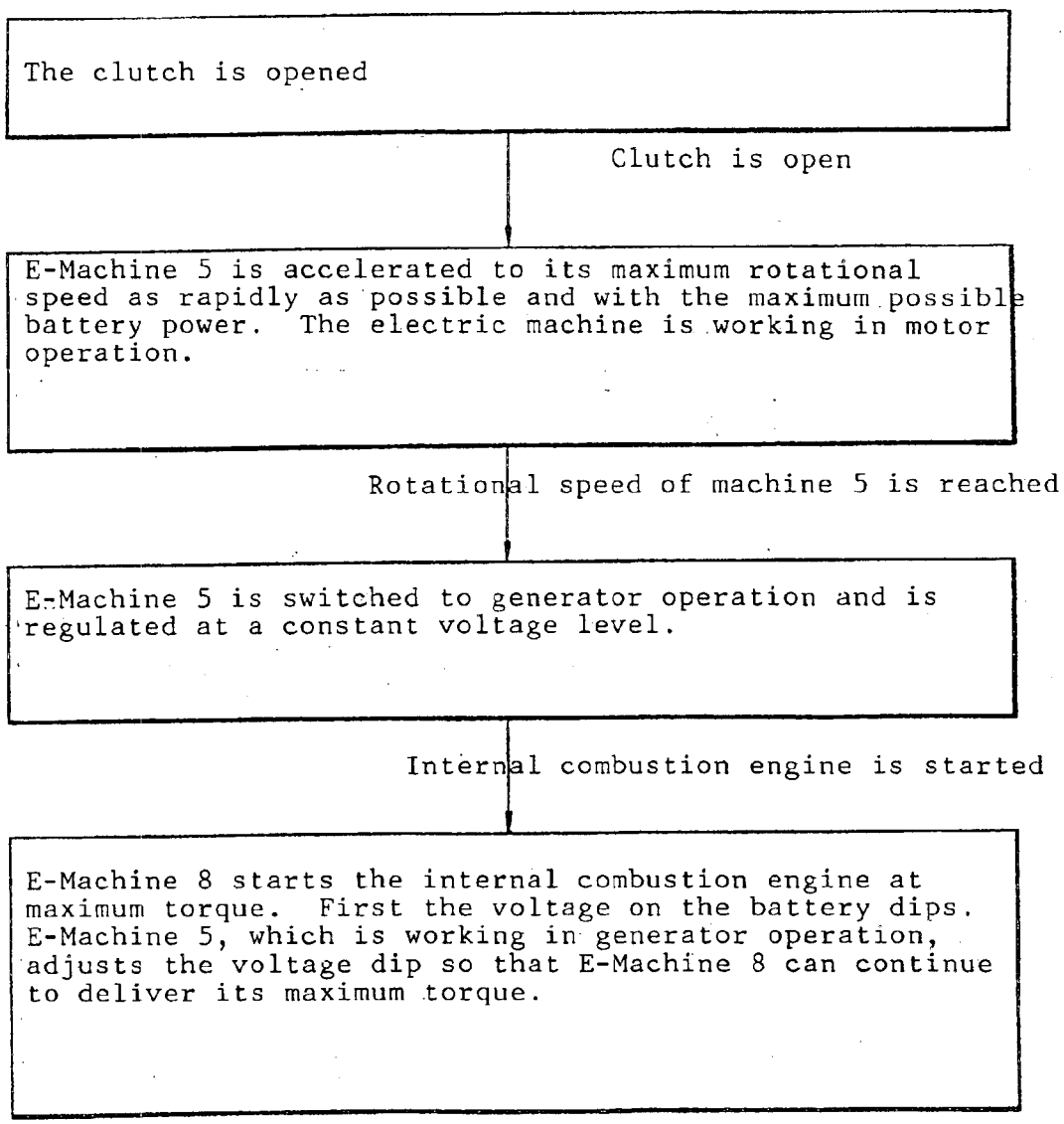
FIG. 2 shows a flow chart for startup of the hybrid drive.

In the flow chart shown in FIG. 2 for starting the engine, first clutch 4 is opened and electric machine 5 is accelerated to its maximum rotational speed, for example, as rapidly as possible and at the maximum battery power. In doing so, electric machine 5 is operating in motor operation. As soon as electric machine 5 has reached the specified rotational speed, it switches to generator operation and is regulated at a constant voltage level. Then additional electric machine 8 is triggered to start the engine at the highest possible torque. A voltage dip which then occurs across the battery is adjusted by electric machine 5 working in generator operation, so that additional electric machine 8 may still deliver its maximum torque. In generator operation of electric machine 5, the previously stored kinetic energy is converted into on-board electric power. For storing kinetic energy, connected transmission stages and a countershaft may also be used in addition to the rotor.

In a hybrid drive having a dual-E transmission, such as that known from the related art or that illustrated in FIG. 4, the starting operation may proceed as follows, for example:

No gear is engaged on a countershaft S. Countershaft S and thus also electric machine 5 are able to rotate freely.

Any gear is engaged on another countershaft L, and the parking brake is set or the wheel brake is activated. Countershaft L is thus blocked.

Electric machine 5 is then brought to a sufficiently high rotational speed with the available current. Kinetic energy is stored in the inertia of the rotor, the transmission stages and countershaft S.

Electric machine 5 is then decelerated at the maximum generator torque. The rotor of electric machine 5 and thus also the countershaft S are decelerated. The decelerating torque on countershaft S generates a starting torque in the engine with the transmission ratio of a planetary gear P2, thus making an additional contribution to the electric power.

The electric current of electric machine 5 is utilized to drive additional electric machine 8, which thus acts as a motor to accelerate the internal combustion engine. The maximum possible battery current may be utilized here.

Figure 4:
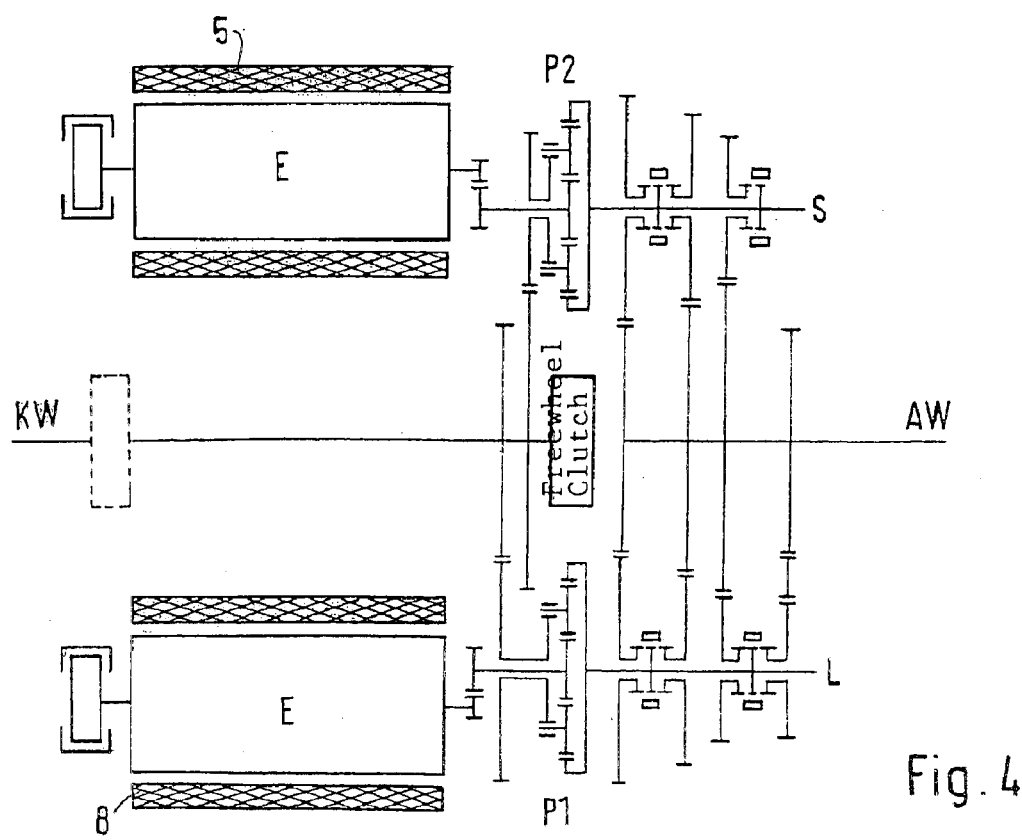
FIG. 4 shows a schematic diagram of a hybrid drive, in which the starting method according to the present invention is implementable.

FIG. 4 also shows a crankshaft KW, an output shaft AW and another planetary gear P1.

Figure 3:
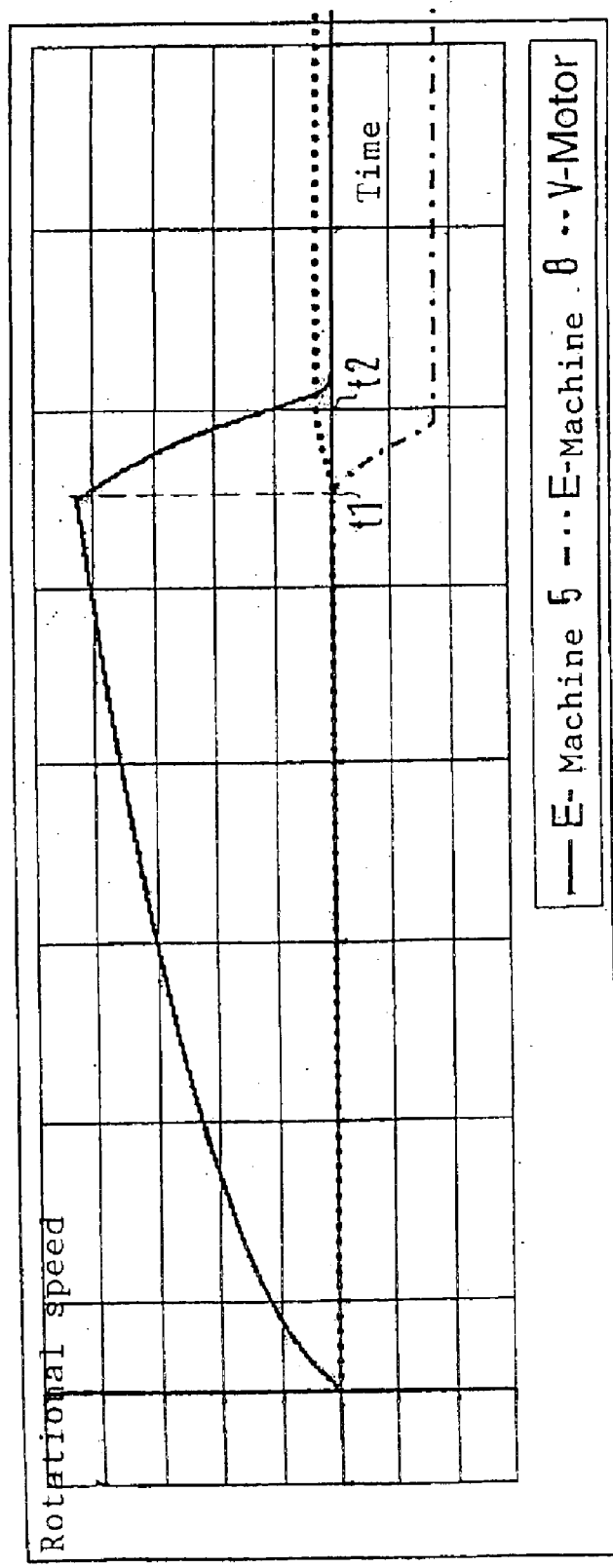
FIG. 3 shows a curve of the rotational speeds of the electric machines and the internal combustion engine.

FIG. 3 shows a curve of the rotational speed of the two electric machines 5, 8 and the internal combustion engine over time, as obtained with the starting operation described here. First the rotational speed of electric machine 5 is brought to a predetermined rotational speed, e.g., the maximum rotational speed, by the available battery power, and then electric machine 5 is switched to generator operation at a point in time t1. The electric power generated by electric machine 5 in generator operation is sent to additional electric machine 8 to start the internal combustion engine. The engine is started again at a point in time t2.

FIG. 1
1—Battery
2—Control unit
5—Electric machine
6—Control unit
8—Electric machine
9—Internal combustion engine
12—Setpoint specification
FIG. 2
The clutch is opened
  Clutch is open
  Electric machine 5 is accelerated to its maximum rotational speed as rapidly as possible and with the maximum possible battery power. The electric machine is working in motor operation.
  Rotational speed of electric machine 5 is reached
  Electric machine 5 is switched to generator operation and is regulated at a constant voltage level.
  Internal combustion engine is started
  Electric machine 8 starts the internal combustion engine at maximum torque. First the voltage on the battery dips. Electric machine 5, which is working in generator operation, adjusts the voltage dip so that electric machine 8 can continue to deliver its maximum torque.
FIG. 3
Rotational speed
  Time
  Electric machine 5 Electric machine 5 Combustion engine

What is claimed is:

1. A method for starting a hybrid drive including a battery, an internal combustion engine, and at least two electric machines including at least one first electric machine and at least one second electric machine, the method comprising:
   coupling the at least one first electric machine, which is used to start the internal combustion engine, to the internal combustion engine at a beginning of a starting phase, before an actual starting of the internal combustion engine, while at least one second electric machine is brought to a specifiable rotational speed in a state that is uncoupled from the internal combustion engine and while electric power is being supplied from the battery;
   switching the at least one second electric machine to a generator operation at a point in time;
   supplying an electric power generated by the at least one second electric machine in the generator operation after reaching the specifiable rotational speed to the at least one first electric machine; and
   using the at least one first electric machine to start the internal combustion engine;
   wherein the specifiable rotational speed of the at least one second electric machine is specified as a function of a detected battery state.

2. The method according to claim 1, further comprising:
   regulating a voltage generated by the at least one second electric machine to a constant level in the starting phase of the internal combustion engine.

3. The method according to claim 1, further comprising:
   additionally supplying the at least one first electric machine with electric power from the battery during the starting phase.

4. The method according to claim 1, further comprising:
   using a decelerating torque of the at least one second electric machine during the generator operation to start the internal combustion engine.

5. The method according to claim 1, further comprising:
   regulating a voltage generated by the at least one second electric machine to a constant level in the starting phase of the internal combustion engine; and
   additionally supplying the at least one first electric machine with electric power from the battery during the starting phase.

6. The method according to claim 1, further comprising:
   additionally supplying the at least one first electric machine with electric power from the battery during the starting phase; and
   using a decelerating torque of the at least one second electric machine during the generator operation to start the internal combustion engine.

7. The method according to claim 1, further comprising:
   regulating a voltage generated by the at least one second electric machine to a constant level in the starting phase of the internal combustion engine; and
   using a decelerating torque of the at least one second electric machine during the generator operation to start the internal combustion engine.

* * * * *